United States Patent [19]
Polster

[11] Patent Number: 5,993,886
[45] Date of Patent: Nov. 30, 1999

[54] METHOD AND CONTROL SYSTEM FOR CONTROLLING PASTEURIZATION OF IN-SHELL EGGS

[76] Inventor: Louis S. Polster, 2205 Marthas Rd., Alexandria, Va. 22307

[21] Appl. No.: 09/001,677

[22] Filed: Dec. 31, 1997

[51] Int. Cl.$^6$ .................................. A23B 5/00; A23L 1/32
[52] U.S. Cl. ............................. 426/614; 99/453; 99/468; 99/483; 426/521
[58] Field of Search .............................. 99/451, 452, 453, 99/467, 468, 516, 485, 486, 483; 422/21, 22, 24, 158, 33, 61, 307, 905–907, 117, 119; 426/521, 614; 116/206; 364/528.17; 219/497, 508, 492

[56] References Cited

U.S. PATENT DOCUMENTS

| | | |
|---|---|---|
| 212,007 | 2/1879 | Inglis et al. . |
| 447,221 | 7/1891 | Geren ........................................ 99/451 |
| 709,583 | 9/1902 | Schöning . |
| 1,092,897 | 4/1914 | Clairemont . |
| 1,163,873 | 12/1915 | Thornburgh . |
| 1,197,707 | 9/1916 | Bennett . |
| 1,261,724 | 4/1918 | Duke . |
| 1,388,024 | 8/1921 | Clairemont et al. . |
| 1,520,424 | 12/1924 | McCullough . |
| 1,888,415 | 11/1932 | Swenson . |
| 1,922,143 | 8/1933 | Sharp . |
| 1,943,468 | 1/1934 | Bridgeman et al. . |
| 2,001,628 | 5/1935 | Niernick . |
| 2,184,063 | 12/1939 | Meyer et al. . |
| 2,222,000 | 11/1940 | Schmidt . |
| 2,236,773 | 4/1941 | Fischer . |
| 2,337,666 | 12/1943 | Koonz et al. . |
| 2,423,233 | 7/1947 | Funk . |
| 2,438,168 | 3/1948 | Hearst et al. . |
| 2,439,808 | 3/1948 | Hodson . |
| 2,497,817 | 2/1950 | Hale et al. . |
| 2,565,311 | 8/1951 | Koonz et al. . |
| 2,673,160 | 3/1954 | Feeney et al. . |

(List continued on next page.)

FOREIGN PATENT DOCUMENTS

| | | |
|---|---|---|
| 268095-A1 | 3/1993 | France . |
| 72454 | 4/1953 | Netherlands . |
| 242780 | 11/1925 | United Kingdom . |
| WO 92/21254 | 12/1992 | WIPO . |
| WO 95/12320 | 5/1995 | WIPO . |
| WO 95/14388 | 6/1995 | WIPO . |
| WO 9518538 | 7/1995 | WIPO . |
| WO 97/07691 | 3/1997 | WIPO . |

OTHER PUBLICATIONS

E.M. Funk, "Pasteurization of Shell Eggs," University of Missouri, College of Agricultural Experiment Station, Research Bulletin 364, pp. 1–28 (May 1943).

M.E. St. Louis, "The Emergence of Grade A Eggs as a Major Source of *Salmonella Enteritidis* Infections," JAMA vol. 259, No. 14, pp. 2103–2107 (April 8, 1988).

E.M. Funk, "Maintenance of Quality in Shell Eggs by Thermostabilization," University of Missouri, College of Agriculture, Agricultural Experiment Station, Research Bulletin 467, pp. 1–46 (Dec. 1950).

Food Industry, vol. p 341, Mar. 1948, p. 71.

E.M. Funk, "Stabilizing Quality in Shell Eggs," University of Missouri, College of Agriculture, Agricultural Experiment Station, Research Bulletin 362, pp. 1–38 (Apr. 1943).

Oliver Products Company, "The Oliver® Aqua–Therm™Compu–Therm™ Water Convection Oven System," Brochure No. 11134–1–May 1993, undated.

*Primary Examiner*—Timothy Simone
*Attorney, Agent, or Firm*—Oliff & Berridge, PLC

[57] ABSTRACT

In a method and control system for controlling pasteurization of in-shell eggs, the internal temperature of the eggs, at least one log kill rate of Salmonella based on the internal temperature of the eggs and a cumulative log kill of Salmonella as a function of the log kill rate and time are at least periodically determined. The cumulative log kill is at least periodically compared to at least one predetermined value, and a signal is generated when a predetermined relationship arises between the cumulative log kill and the predetermined value(s).

36 Claims, 8 Drawing Sheets

U.S. PATENT DOCUMENTS

| | | |
|---|---|---|
| 2,758,935 | 8/1956 | Shaffer . |
| 2,776,214 | 1/1957 | Lloyd et al. . |
| 3,027,734 | 4/1962 | Mills . |
| 3,028,245 | 4/1962 | Mink et al. . |
| 3,046,143 | 7/1962 | Lowe et al. . |
| 3,082,097 | 3/1963 | Haller . |
| 3,113,872 | 12/1963 | Jones et al. . |
| 3,144,342 | 8/1964 | Collier et al. . |
| 3,148,649 | 9/1964 | Moore et al. . |
| 3,321,316 | 5/1967 | De Paolis et al. . |
| 3,364,037 | 1/1968 | Mink et al. . |
| 3,420,790 | 1/1969 | Gassner et al. . |
| 3,461,680 | 8/1969 | Rische . |
| 3,522,061 | 7/1970 | Whiteford . |
| 3,658,558 | 4/1972 | Rogers et al. . |
| 3,663,233 | 5/1972 | Keszler . |
| 3,831,389 | 8/1974 | Lipona . |
| 3,843,813 | 10/1974 | Driggs . |
| 3,865,965 | 2/1975 | Davis et al. . |
| 3,882,686 | 5/1975 | Rose . |
| 4,045,579 | 8/1977 | Rogers . |
| 4,157,650 | 6/1979 | Guibert . |
| 4,302,142 | 11/1981 | Kuhl et al. . |
| 4,362,094 | 12/1982 | Polster . |
| 4,503,320 | 3/1985 | Polster . |
| 4,511,589 | 4/1985 | Padly et al. ............................ 426/521 |
| 4,524,082 | 6/1985 | Liot . |
| 4,524,083 | 6/1985 | Liot . |
| 4,534,282 | 8/1985 | Marinoza .............................. 99/453 X |
| 4,537,208 | 8/1985 | Kuhl . |
| 4,666,722 | 5/1987 | Creed et al. . |
| 4,702,777 | 10/1987 | Kuhl . |
| 4,808,425 | 2/1989 | Swartzel et al. . |
| 4,999,471 | 3/1991 | Guarneri et al. . |
| 5,105,724 | 4/1992 | Swartzel et al. ...................... 99/483 X |
| 5,179,265 | 1/1993 | Sheridan et al. . |
| 5,283,072 | 2/1994 | Cox et al. . |
| 5,288,471 | 2/1994 | Corner ................................... 422/307 |
| 5,290,583 | 3/1994 | Reznik et al. . |
| 5,306,466 | 4/1994 | Goldsmith ................................ 422/61 |
| 5,393,541 | 2/1995 | Bushnell et al. ......................... 99/451 |
| 5,431,939 | 7/1995 | Cox . |
| 5,445,062 | 8/1995 | Polster . |
| 5,474,794 | 12/1995 | Anderson et al. . |
| 5,494,687 | 2/1996 | Polster . |
| 5,503,064 | 4/1996 | Scheel et al. ............................ 99/468 |
| 5,549,041 | 8/1996 | Zhang et al. ............................ 99/451 |
| 5,589,211 | 12/1996 | Cox et al. . |
| 5,869,341 | 2/1999 | Woodaman .......................... 422/58 X |

METHOD AND CONTROL SYSTEM FOR CONTROLLING PASTEURIZATION OF IN-SHELL EGGS

BACKGROUND OF THE INVENTION

1. Field of Invention

The present invention relates to a method and control system for controlling pasteurization of in-shell eggs in a fluid.

2. Description of Related Art

The United States Department of Agriculture (USDA) regulates minimum safety standards for pasteurizing in-shell eggs. These standards are promulgated in order to ensure that certain microorganisms, including such infectious organisms as Salmonella, are substantially destroyed prior to distribution and consumption of the eggs. The USDA defines pasteurization as a heat treatment for the purpose of killing these disease causing organisms.

One source of infection arises when the egg shells come into contact with organic refuse. Contamination results because the egg shells have numerous pores which permit infectious microbes, which are contained in the organic refuse, to penetrate the pores of the eggs. Another source of infection results from trans-ovarian contamination. This occurs when chickens or other poultry ingest or are otherwise infected by infectious microbes and transfer the microorganisms directly into the eggs.

The Nutrition Action Health Letter published by the Center for Science and the Public Interest (July/August 1991 edition, Vol. 18, No. 6, "Name Your (Food) Poison") reports that in-shell eggs are particularly difficult to pasteurize because of their structure. In addition, this article reveals that one in ten thousand eggs is contaminated with salmonella enteritis.

Techniques for improving pasteurization of eggs have been proposed. These techniques attempt to destroy infectious disease causing organisms in in-shell eggs without substantial loss of functionality. One approach to pasteurizing in-shell eggs involves heating the in-shell eggs in water baths, for various times and at various temperatures. The time/temperature ratios vary widely because different approaches involve a compromise between the degree of safety achieved and the quality or the functionality of the eggs retained after pasteurization is completed. The USDA has devised time/temperature ratios, but they are only for liquid eggs.

Cox et al. (PCT/US94/12950) discloses a method for destroying infectious disease causing organisms in in-shell eggs without substantial loss of functionality. Cox et al. employs a temperature versus time relationship in order to accomplish pasteurization of the in-shell eggs. An initial egg temperature and processing temperature at the beginning of the pasteurizing process of a whole shell egg must be known. These temperatures are used to determine the total processing time, e.g., the total length of time over which the eggs are heated. According to a preferred embodiment of Cox et al., minimum temperatures/time requirements for liquid whole eggs are applied equivalently to in-shell eggs once the selected pasteurization temperature has been achieved at the shell egg yolk center.

Cox et al. uses the following temperature time table for determining the pasteurization time of in-shell eggs.

| Temperature | Real Processing Time (RPT) (Minutes) |
|---|---|
| 130° F. | =65 |
| 131° F. | =49 |
| 132° F. | =38 |
| 133° F. | =28 |
| 134° F. | =20 |
| 135° F. | =16 |
| 136° F. | =11 |
| 137° F. | =8 |
| 138° F. | =6 |
| 139° F. | =4.75 |
| 140° F. | =3.5 |

This table describes the processing of in-shell eggs after they attain the required pasteurizing preprocessing temperature. The initial temperature is applied until the in-shell eggs reach a temperature equilibrium with the heat transfer medium. The RPT for a given pasteurization regimen can only begin after this point has been reached.

Cox et al. also discloses that factors including the size and internal initial temperature of the eggs may affect the time required for the eggs to reach the effective processing temperature. Thus, an initial temperature that causes pasteurization of one batch of eggs may result in impaired functionality of a second batch of eggs having a smaller size, depending on the variables associated with that particular batch of eggs.

Davidson International Application No. PCT/US96/13006 (U.S. application Ser. No. 08/519,184), also discloses methods to pasteurize in-shell eggs using time/temperature relationships. In particular, Davidson discloses heating a yolk of the egg to within the range of 128° F. to 138.5° F. Once the yolk reaches this temperature range, it must be maintained at this temperature range for a certain time and within certain parameters.

FIG. 1 shows a temperature versus time curve implemented by the Davidson system. This curve is based substantially on the data of the above table. Referring to FIG. 1, the temperature of the egg yolk must be maintained between parameter line A and parameter line B in order for sufficient pasteurization to occur. According to Davidson, this will reduce the Salmonella by at least 5 logs, while at the same time retaining the functionality of the eggs. If the eggs are heated to a limit outside parameter lines A and B, however, the eggs will either lose their functionality or remain insufficiently pasteurized. Thus, according to Davidson it is imperative that the temperature of this system stay within the predefined parameters.

Factors such as loss of water, temperature overshoot (e.g. raising the temperature too high), inefficient temperature sensors (e.g. low response time for raising the temperature to a predefined temperature range), and numerous other factors make it possible for the bath temperature to stray from preferred parameters. The size of the eggs, the number of eggs placed in the bath and the initial internal temperature of the eggs will also affect the pasteurization time and functionality of the eggs.

SUMMARY OF THE INVENTION

The present invention comprises a method and control system for controlling pasteurization of in-shell eggs by a heated fluid.

In the method and control system of the present invention, in-shell eggs are enveloped by a heated fluid. The internal temperature of the eggs, while they are enveloped by the heated fluid, is periodically or continuously determined. At least one log kill rate of Salmonella in the eggs based on the internal temperature of the eggs is also periodically or continuously determined.

A cumulative log kill of Salmonella as a function of the at least one log kill rate and time is also periodically or continuously determined. The cumulative log kill is compared to at least one predetermined value. A signal is generated when a predetermined relationship between the cumulative log kill and the predetermined value is revealed. The time at which comparing takes place may be before, at and/or after a predetermined time at which sufficient pasteurization is expected to be completed.

A control system for pasteurizing the in-shell eggs is also provided.

BRIEF DESCRIPTION OF THE DRAWINGS

The invention will be described in conjunction with the following drawings in which like reference numerals designate like elements and wherein.

DETAILED DESCRIPTION OF EMBODIMENTS

Figure 1:
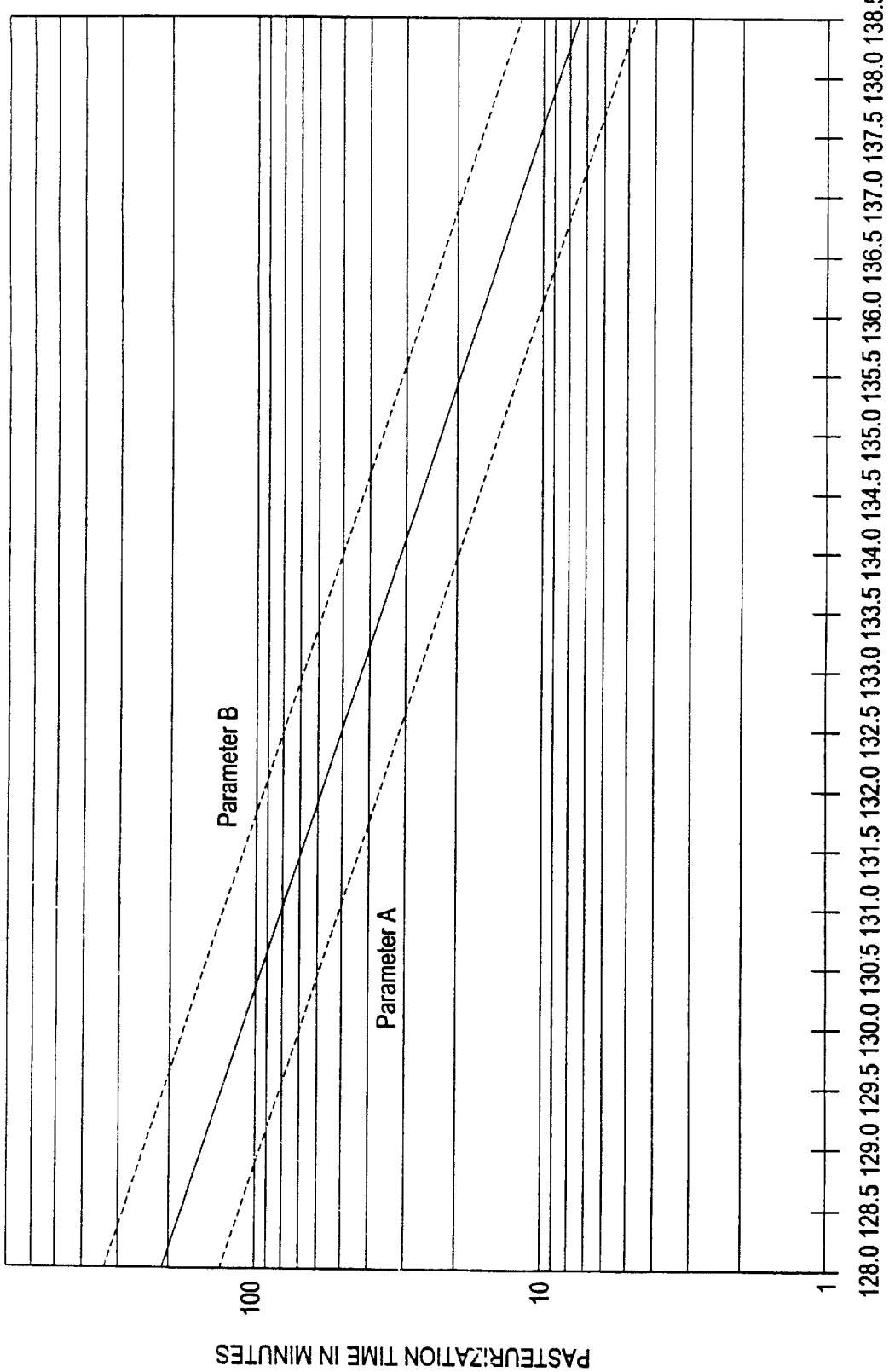
FIG. 1 shows a temperature versus time curve implemented by the Davidson system.

The present invention is directed to a method and control system for controlling pasteurization of in-shell eggs in a fluid. The fluid may include a liquid or a gas, as described in simultaneously filed patent application Ser. No. 09/002,244 (Docket No. WPB 39608) entitled "Apparatus And Methods For Pasteurizing In-Shell Eggs", which is incorporated herein by reference in its entirety.

The present invention can allow a pasteurizing method and apparatus to achieve at least a satisfactory reduction in Salmonella or the like without substantially affecting the functionality of the eggs, despite temperature fluctuations in the fluid and thus inside the eggs. This may be accomplished by providing a method and control system that at least periodically determines (i) an internal temperature of the eggs and thus a log kill of Salmonella and/or other infectious microorganisms in the eggs and (ii) a dwell time of the eggs at each such temperature so that a cumulative log kill of Salmonella and/or other infectious diseases can be calculated and used to control the process.

In order for eggs to be pasteurized they are first enveloped by a fluid. A single, two, three or more fluid system is contemplated for use with the present invention.

Accordingly, once the eggs are enveloped by the fluid, an internal temperature of the eggs is periodically or continuously determined. Repeated experiments have shown that an internal temperature of the eggs may be calculated based on a variety of factors, for example (i) the time the eggs are enveloped by the heated fluid, (ii) the temperature of the heated fluid, (iii) the initial temperature of the eggs and (iv) the size of the eggs. The internal temperature of the eggs may also be determined by (i) fixing the initial temperature of the eggs, (ii) fixing the time the eggs are enveloped by the fluid and (iii) fixing the temperature of the fluid during the time the eggs are enveloped by the fluid.

The initial temperature of the eggs may be determined in various ways. From experimentation, it was found that, for example, the initial temperature of the eggs may be calculated based on (i) the size of the eggs and (ii) the on-time of at least one heating element in the heated fluid required to return a temperature of the heated fluid after the eggs are enveloped by the heated fluid back to a starting temperature of the heated fluid.

That is, the initial temperature of the eggs may be determined by use of known values determined through experimentation. For example, through experiments, the eggs are temperature probed prior to enveloping the eggs in the heated fluid to determine the initial temperature of the eggs. The eggs are then enveloped in the heated fluid and an on-time of the at least one heating element is measured until the temperature of the heated fluid returns to a starting temperature of the heated fluid. By using this process, several on-times of the at least one heating element is determined for varying sized eggs and initial temperatures. These determined on-times of the at least one heating element may then be used to determine the initial temperature of the eggs in future processes.

By way of example, in experiments, eggs were initially probed to determine that the initial temperature of the eggs prior to being enveloped in the heated fluid was 70° F. Two hundred and seventy dozen eggs at the initial temperature of 70° F. were enveloped in a 137° F. heated fluid. The on-time of the at least one heating element was measured until the temperature of the heated fluid returned to a starting temperature of the heated fluid. In this experiment, the on-time of the at least one heating element was approximately 2 minutes and 50 seconds. By way of further example, in experiments, eggs were initially probed to determine that the initial temperature of the eggs prior to being enveloped in the heated fluid was 45° F. Two hundred and seventy dozen eggs at the initial temperature of 45° F. were enveloped in a 137° F. heated fluid. The on-time of the at least one heating element was measured until the temperature of the heated fluid returned to a starting temperature of the heated fluid. In this experiment, the on-time of the at least one heating element was approximately 4 minutes and 25 seconds. It was known during these experiments that the eggs weigh approximately 30 ounces per dozen and that the specific heat of the eggs is 0.88. By using this data, the initial temperature of the eggs for other sized eggs may then be determined by the determined on-times of the at least one heating element. Alternatively, a temperature drop of the fluid may be measured after contacting the eggs.

As another example, the initial temperature of the eggs may be determined by uniformly preheating the eggs to a predetermined initial temperature. This temperature is preferably below a temperature at which pasteurization begins, and more preferably is a temperature that has substantially no effect on the functionality of the eggs. This may be accomplished, for example, by enveloping the eggs in a preheating fluid for at least a minimum period of time to ensure that all of the eggs have a uniform initial internal temperature. In embodiments, the preheating temperature of the fluid may be a temperature in the range of approximately 60°–100° F., and preferably 80°–100° F., and more preferably 80°–90° F. However, other temperature ranges are also contemplated for use with the invention so long as the temperature range does not affect the functionality of the eggs prior to pasteurization.

At least one log kill rate of Salmonella or other infectious microorganisms is periodically or continuously determined from the internal temperature of the eggs. The log kill rates for various temperatures may be determined from FIG. 1. A cumulative log kill of Salmonella as a function of the at least one log kill rate and time is also periodically or continuously determined.

In preferred embodiments, the data of Table A may be used for determining the log kill rate(s) and the cumulative log kill of Salmonella. The internal temperature of the eggs is monitored as described above. Fluctuating temperatures of the fluid are reflected in changing internal temperatures of the eggs. The log kill rate at each temperature may be multiplied by the time the eggs are at such temperature and the products may be summed to determine a cumulative log kill of the eggs at any given time. The first two columns of Table A are derived from data disclosed in Cox et al. and Davidson, which are both incorporated herein by reference in their entirety.

TABLE A

| Temperature | Real Processing Time (RPT) (5 log reduction) | Minutes/log | Pulse Rate (×100) |
| --- | --- | --- | --- |
| 130° F. | =65 | 13 | 770 |
| 131° F. | =49 | 9.8 | 1,020 |
| 132° F. | =38 | 7.6 | 1,320 |
| 133° F. | =28 | 5.6 | 1,790 |
| 134° F. | =20 | 4 | 2,500 |
| 135° F. | =16 | 3.2 | 3,130 |
| 136° F. | =11 | 2.2 | 4,550 |
| 137° F. | =8 | 1.6 | 6,250 |
| 138° F. | =6 | 1.2 | 8,330 |

The first column of Table A shows the temperature of the heated fluid. The second column shows a time needed for a 5 log reduction of Salmonella at a given temperature level. The third column shows a required time for a one log reduction of Salmonella at that temperature level. The fourth column shows an exemplary "pulse rate" that may be used for accurately determining a reduction of Salmonella at a given temperature level. In this table, an arbitrary value of 10,000 pulses per log has been set, and the pulse rate shown is in pulses per minute.

The temperature of the fluid and thus the internal temperature of the eggs may fluctuate over time. Due to this fluctuation, the pulse rate will also fluctuate over time. For example, while the temperature of the bath is 130° F., the counter may, for example, count 770 pulses per minute. When the temperature of the bath increases to 138° F., the pulse rate increases, for example, to 8,330 pulses per minute.

Because of the known relationship between the temperature of the bath and the pulse rate, the present method can accurately calculate the cumulative log kill. For example, a pulse counter may count the pulses until the cumulative log kill reaches a predetermined value, such as 30,000 pulses for a 3 log reduction in Salmonella, or 50,000 pulses for a 5 log reduction in Salmonella. In alternative embodiments, the cumulative log kill may be calculated by integrating an area under a curve, as discussed below.

The cumulative log kill is periodically or continuously compared to at least one predetermined value. The time(s) at which comparing takes place, for example, may be before, at or after a predetermined time at which sufficient pasteurization is expected to be completed.

In embodiments, the comparing may take place at periodic or continuous intervals while the pulse counter is, for example, counting the pulses, as described above. For example, in embodiments, the method of the present system compares the cumulative log kill, e.g., number of counted pulses, to a predetermined value, e.g. at least 3 (or 5) log reduction in Salmonella or at least 30,000 (or 50,000) pulses, for accurately determining when the cumulative log kill substantially indicates a desired degree of pasteurization. Alternatively, or in addition, the comparing may take place at intermediate times in the pasteurization process. In this case, the comparison may, for example, be with predetermined values that reflect an expected degree of pasteurization for the time at which the comparison takes place. Such comparisons may be periodic, e.g. at an expected time of each one or fraction of one log reduction of Salmonella, or even continuous.

A signal is generated when a predetermined relationship between the cumulative log kill and a predetermined value is revealed. In preferred embodiments, a signal may be generated when the cumulative log kill of Salmonella is approximately the desired degree of pasteurization. The eggs can then be removed from the heated fluid in response to the signal and cooled. In a preferred embodiment, they may be enveloped by a cooling bath as disclosed in simultaneously filed patent application Ser. No. 09/001,673 (Docket No. WPB 39610) entitled "Method And Apparatus For Chilling In-Shell Eggs", which is incorporated herein by reference in its entirety.

Several other signals may also be generated at various times during the pasteurization process. For example, a signal may be generated when the eggs are sufficiently pasteurized to be removed from the fluid and placed in a second or subsequent heated fluid. In this example, the eggs may be moved from one temperature zone to another temperature zone, such as in a two or three fluid system, as described below. A signal may also be generated when, for example, the temperature of the heated fluid needs to be increased and/or decreased so that a cumulative log kill of Salmonella within an acceptable time can be achieved. In embodiments of the present invention, a dwell time of the eggs in the heated fluid may be adjusted in response to a signal. That is, a rate of movement through the heated fluid of the eggs may be varied in response to the signal.

Another signal may be generated, for example, if the comparison reveals that the eggs are substantially more or less pasteurized than expected for a given point in the pasteurization process. In such cases, the signal may indicate that the functionality of the eggs would have been substantially impaired or would be substantially impaired by completing pasteurization. In this example, the eggs may be removed from the heated fluid and subsequently, e.g., discarded, cooked or broken and further processed as liquid egg in response to the signal.

The Control System

Figure 2:
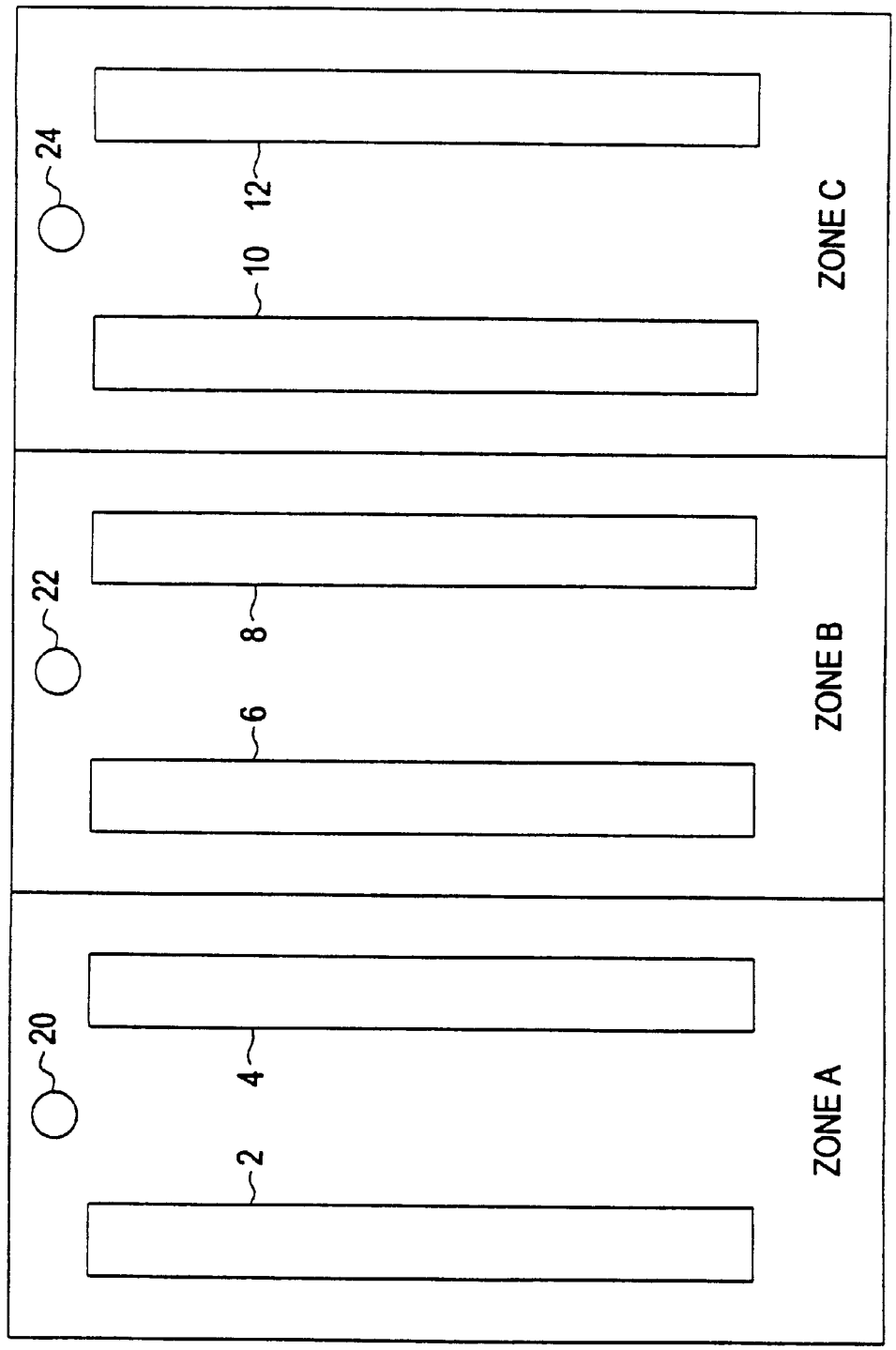
FIG. 2 is a plan view of a single bath having a plurality of heating elements and a plurality of temperature sensors.

Referring to FIG. 2, a single fluid bath having a plurality of heating elements and a plurality of temperature sensors is shown. In embodiments, heating elements 2 and 4 are located in zone A, heating elements 6 and 8 are located in zone B and heating elements 10 and 12 are located in zone C. The heating elements may be arranged in zones so that uneven loading will not, for example, cause overheating in the entire bath. Preferably, the heating elements are low watt density heating elements which supply substantially constant heat energy per unit of time to the fluid.

Preferably, if a plurality of heaters is provided per zone, then the heaters may be substantially equally spaced apart. However, the heaters should be located to advantageously maintain the desired fluid temperature substantially uniformly throughout the bath. Exemplary heating elements and arrangements thereof are described in the above-mentioned simultaneously filed Patent Application entitled "Apparatus And Methods For Pasteurizing In-Shell Eggs".

In embodiments, a perturbating means for vertically perturbating the fluid may also be provided. The perturbation is preferably provided in a vertical direction emanating from below and being directed upwards towards and through the at least one layer of in-shell eggs in the fluid—e.g., in the form of bubbles through a liquid bath. The pertubation of the fluid substantially eliminates temperature stratification in the fluid and provides for a more efficient heat transfer between the eggs and the fluid. The perturbation may, for example, reduce the dwell time of the eggs prior to and during pasteurization as well as keep the fluid temperature at a substantially constant level. Pertubating means is described in the above-mentioned simultaneously filed Patent Application entitled "Apparatus And Methods For Pasteurizing In-Shell Eggs".

Referring again to FIG. 2, at least one temperature sensor (preferably two or more where redundancy is desired) is located in each zone of the fluid. For example, temperature sensor 20 is located in zone A, temperature sensor 22 is located in zone B and temperature sensor 24 is located in zone C. The location of the temperature sensors enables the sensors to quickly detect rising and falling temperatures of the fluid, thus avoiding temperature overshoot, i.e. potential overrun of the temperature in a zone. The temperature sensors also may provide the actual temperature of the fluid so as to compute the initial temperature of the eggs.

Figure 2A:
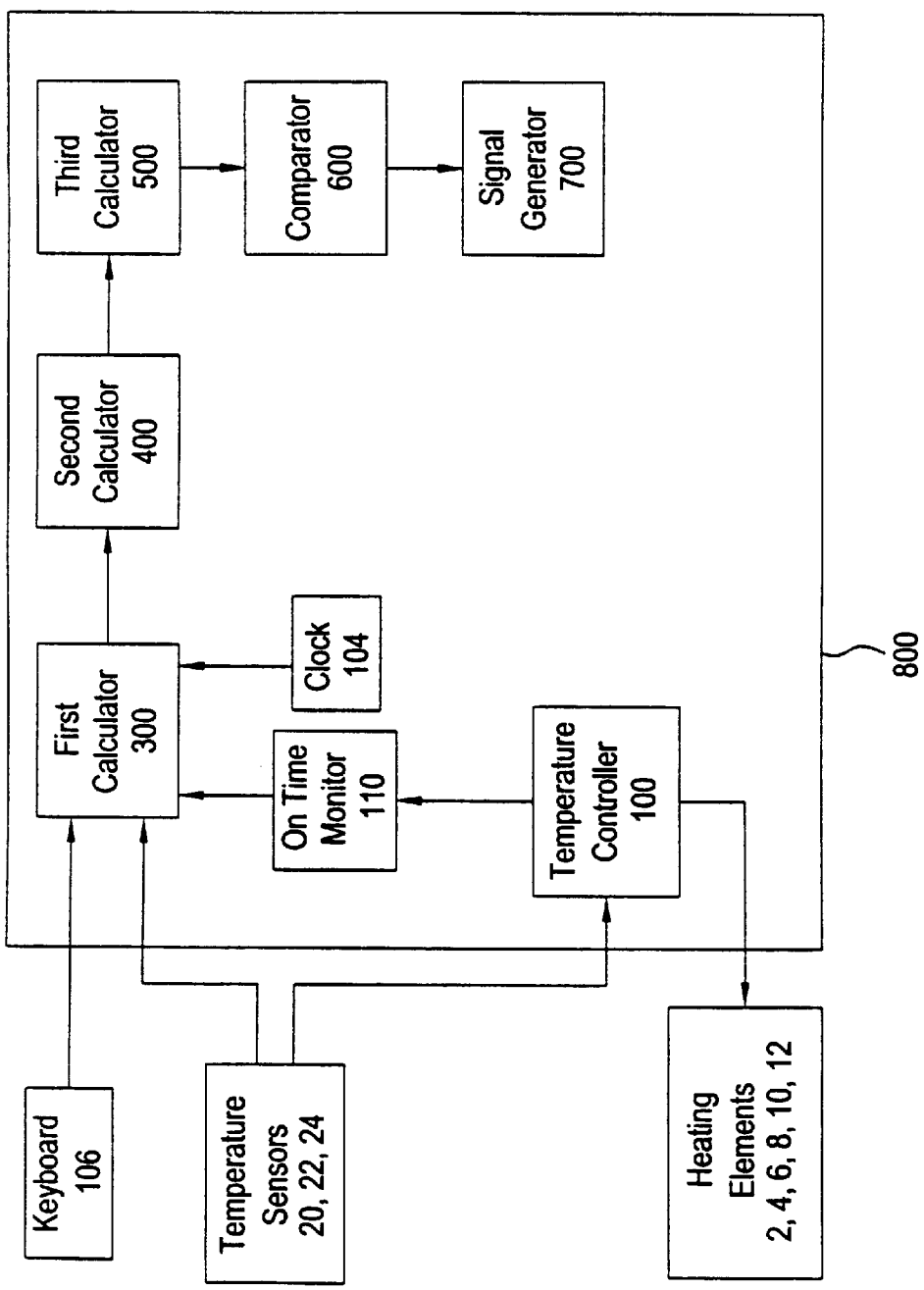
FIG. 2a shows an exemplary embodiment of a control system used by the present invention.

FIG. 2a shows a block diagram of an embodiment of the present invention. A temperature controller 100 controls the heating elements for uniformly maintaining the temperature of fluid within the desired temperature range, preferably less than or equal to about ±2° F., preferably, ±1° F., more preferably, ±0.1° F. and, even more preferably, ±0.03° F. Temperature control systems are described in the above-mentioned simultaneously filed Patent Application entitled "Apparatus And Methods For Pasteurizing In-Shell Eggs".

To avoid temperature overshoot and other temperature variations, the temperature controller 100 may, for example, control the variations in the temperature of the fluid by turning on and turning off the heating elements 2, 4, 6, 8, 10, 12. The temperature controller 100 may turn on the heating elements when the temperature of the fluid falls below a predetermined temperature and turn off the heating elements when the temperature of the fluid substantially equals and/or exceeds the predetermined temperature. In this manner the temperature controller 100 periodically or continuously controls the temperature of the fluid. An on-time monitor 110 may also be provided to monitor the on-time of the heating elements.

A first calculator 300 periodically or continuously determines the internal temperature of the eggs. Preferably, the internal temperature of the eggs is determined by (i) the time the eggs are enveloped by the heated fluid, (ii) the temperature of the heated fluid, (iii) the initial temperature of the eggs and (iv) the size of the eggs. The initial temperature of the eggs may be determined in various manners e.g., calculated (for example by the first calculator 300) or directly input (e.g., via keyboard 106, as described above. The temperature of the fluid may be input from temperature sensors 20, 22, 24, etc. The immersion time may be input from an internal or external clock 104. The size of the eggs may be automatically entered (e.g., by a bar code reader and a bar code on the egg container(s)) or manually entered (e.g., via keyboard 106). In embodiments, the eggs are weighed prior to manually entering their size.

A second calculator 400 periodically or continuously determines at least one log kill rate of Salmonella based on the internal temperature of the eggs. A third calculator 500 periodically determines the cumulative log kill of Salmonella as a function of the log kill rate and time. A comparator 600 periodically or continuously compares the cumulative log kill to at least one predetermined value. A signal generator 700 may generate several signals at various times during the pasteurization process, as described above, in response to output of the comparator 600. In embodiments, a single programmed processor comprises the temperature controller 100, on time monitor 110, clock 104, first calculator 300, second calculator 400, third calculator 500, comparator 600, and/or signal generator 700, and thus they need not be separate devices or even separate programs.

The above description has focused on a single fluid system. However, a corresponding discussion applies to two or more fluid systems, as exemplified in more detail below.

Single Fluid Systems

Figure 3:
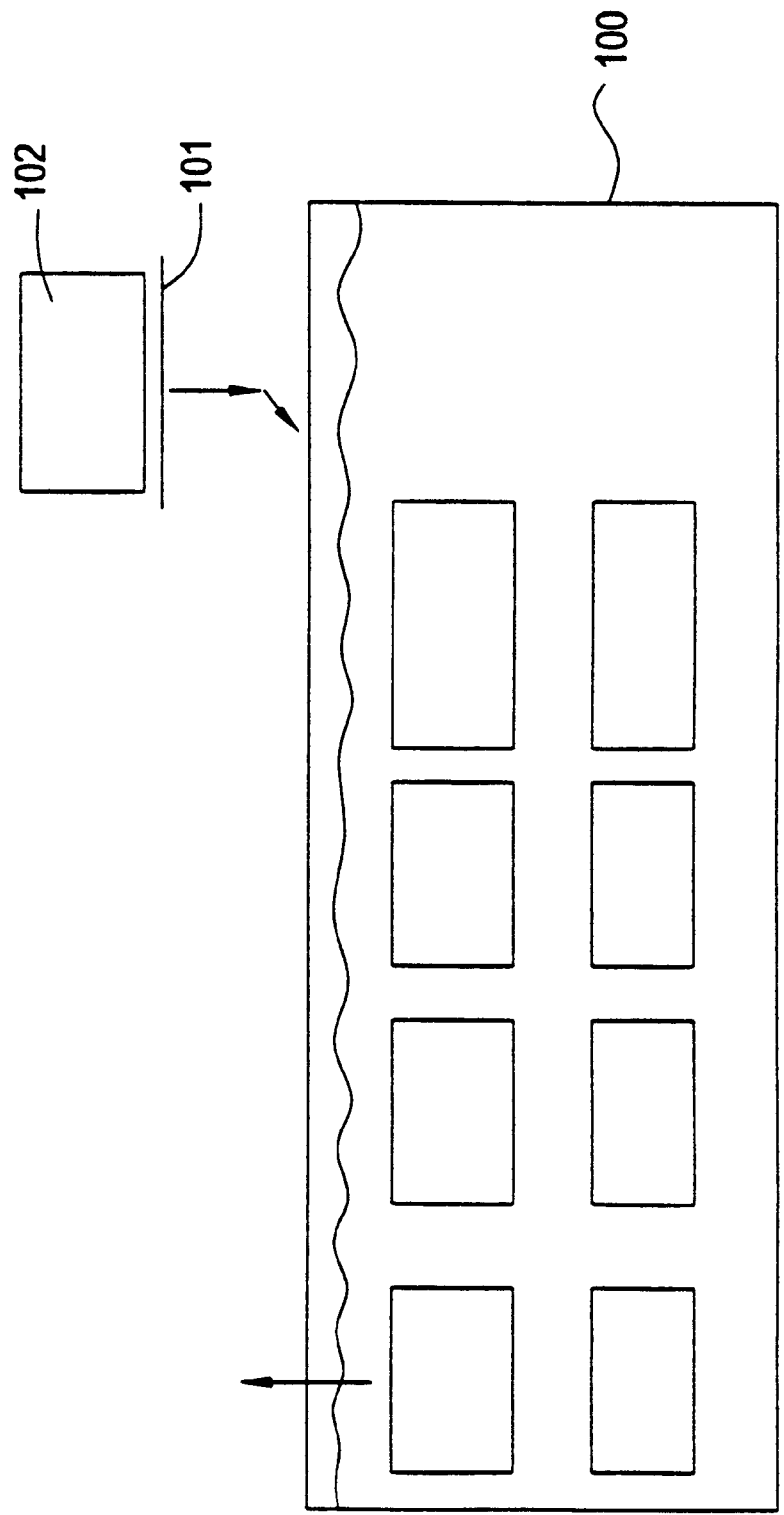
FIG. 3 is a cross sectional view of a single bath system.

Referring to FIG. 3, in embodiments a loading mechanism 101 envelops a batch of eggs 102 in the single liquid bath 100 and transports the eggs through the liquid for pasteurization of the eggs without substantial loss of functionality. Using the data of Table B, for example, the first calculator 300 periodically or continuously determines the internal temperature of the eggs. The second calculator 400 periodically or continuously determines at least one log kill rate of Salmonella based on the internal temperature of the eggs. (In this example, a count of 100 pulses substantially equals a one log reduction of Salmonella.)

Referring to Table B, in one embodiment, for example, the nominal temperature of the fluid may be approximately 133.5° F. At this temperature the eggs may take approximately 12 to 15 minutes to reach an internal temperature of 130° F. at which time the process of Table B begins. Temperature drops by the fluid due to heat absorption by the eggs may affect the internal temperature of the eggs. However, the temperature drop of the fluid and the affected internal temperature of the eggs is taken into consideration when determining the cumulative log kill of Salmonella or other microorganisms.

Referring again to Table B, for example, at minute one the temperature of the fluid is 130° F., e.g., 770 pulses per minute. At minute two the temperature of the fluid is 132° F., e.g., 1,320 pulses per minute. At minute three the temperature of the fluid is 133.5° F., e.g., 2,080 pulses per minute. At minute four the temperature of the fluid is 135° F., e.g., 3,130 pulses per minute. At minute five the temperature of the fluid is 134° F., e.g., 2,500 pulses per minute. At minute six the temperature of the fluid is 133° F., e.g., 1,790 pulses per minute. At minute seven the temperature of the fluid is 132° F., e.g., 1,320 pulses per minute. At minute eight the temperature of the fluid is 133° F., e.g., 1,790 pulses per minute. At minutes nine through eleven the temperature of the fluid is 134° F., e.g., 2,500 pulses per minute. At minute twelve the temperature of the fluid is 135° F., e.g., 3,130 pulses per minute. At minutes thirteen and fourteen the temperature of the fluid is 133° F., e.g., 1,790 pulses per minute.

The third calculator 500 periodically determines the cumulative log kill of Salmonella as a function of the log kill rate and time. This is calculated by periodically counting the cumulative number of pulses over a predetermined time that the eggs are enveloped by the fluid. According to the above example, the eggs achieve a 3 log reduction in Salmonella after approximately 14 minutes in the fluid bath, e.g., because the pulse counter reaches approximately a count of 30,000 pulses. (The one-minute temperature sensing intervals and temperature differences are for illustrative purposes only. In practice, the intervals and differences may be smaller. The pasteurization time may also in practice differ from this example, which for clarity of illustration does not reflect the total sloping up of the internal egg temperature and concomitant initial pasteurization.)

TABLE B

| Minute | Temperature | Pulse Rate |
|--------|-------------|------------|
| 1 | 130° F. | 770 |
| 2 | 132° F. | 1,320 |
| 3 | 133.5° F. | 2,083 |
| 4 | 135° F. | 3,130 |
| 5 | 134° F. | 2,500 |
| 6 | 133° F. | 1,790 |
| 7 | 132° F. | 1,320 |
| 8 | 133° F. | 1,790 |
| 9 | 134° F. | 2,500 |
| 10 | 134° F. | 2,500 |
| 11 | 134° F. | 2,500 |
| 12 | 135° F. | 3,130 |
| 13 | 133° F. | 1,790 |
| 14 | 133° F. | 1,790 |

In the example of Table B, when the eggs are enveloped by the fluid, the temperature of the fluid initially drops to 130° F. The temperature is then increased by the heating elements until the temperature of the fluid reaches 133.5° F. In this example, the heating elements are initially turned on for approximately three minutes in order for the temperature of the fluid to rise until it substantially equals the initial temperature of the fluid prior to the eggs being enveloped by the fluid. Thereafter, the temperature of the fluid is periodically or continuously controlled.

Figure 4:
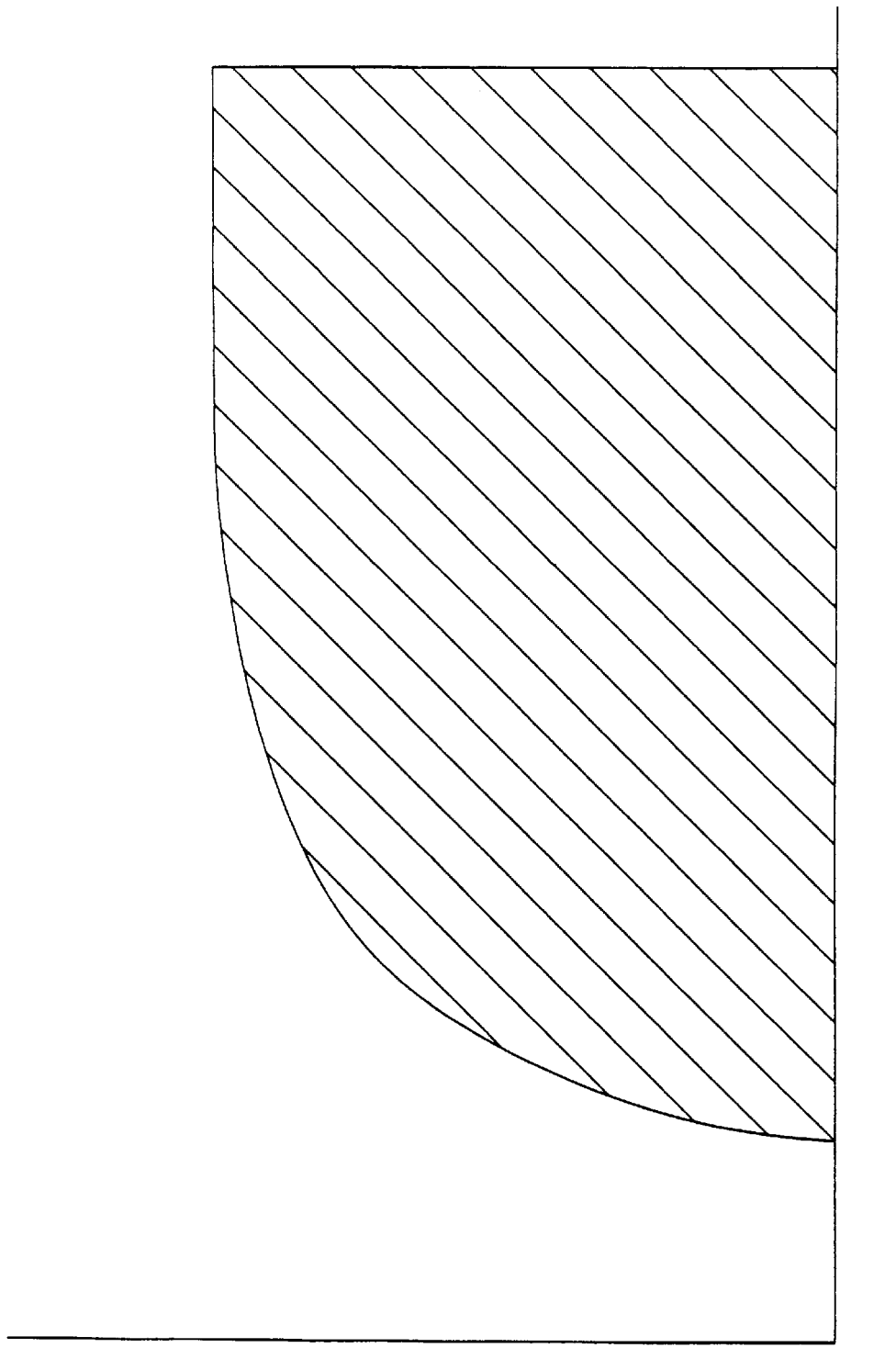
FIG. 4 shows a log kill rate versus time curve for a single bath system.

As an illustrative example of the method of calculating the cumulative log kill, FIG. 4 shows the cumulative log kill as an area under a log kill rate versus time curve. The area under the curve is calculated by integration, e.g., counting the pulses as described above. (The area under the curve of FIG. 4 represents a 5 log reduction in Salmonella and thus does not correspond to the example of Table B.)

As seen in FIG. 4, after an initial time the log kill rate begins to slope upwards. Thereafter, the log kill rate substantially levels off. As described above, however, the internal temperature of the eggs may fluctuate over time, thus, for example, resulting in fluctuations of the log kill rate, as seen in FIG. 4. During this process the comparator 600 periodically or continuously compares the area under the curve, which reflects the cumulative log kill, to one or more predetermined values.

Multiple Fluid Systems

Figure 5:
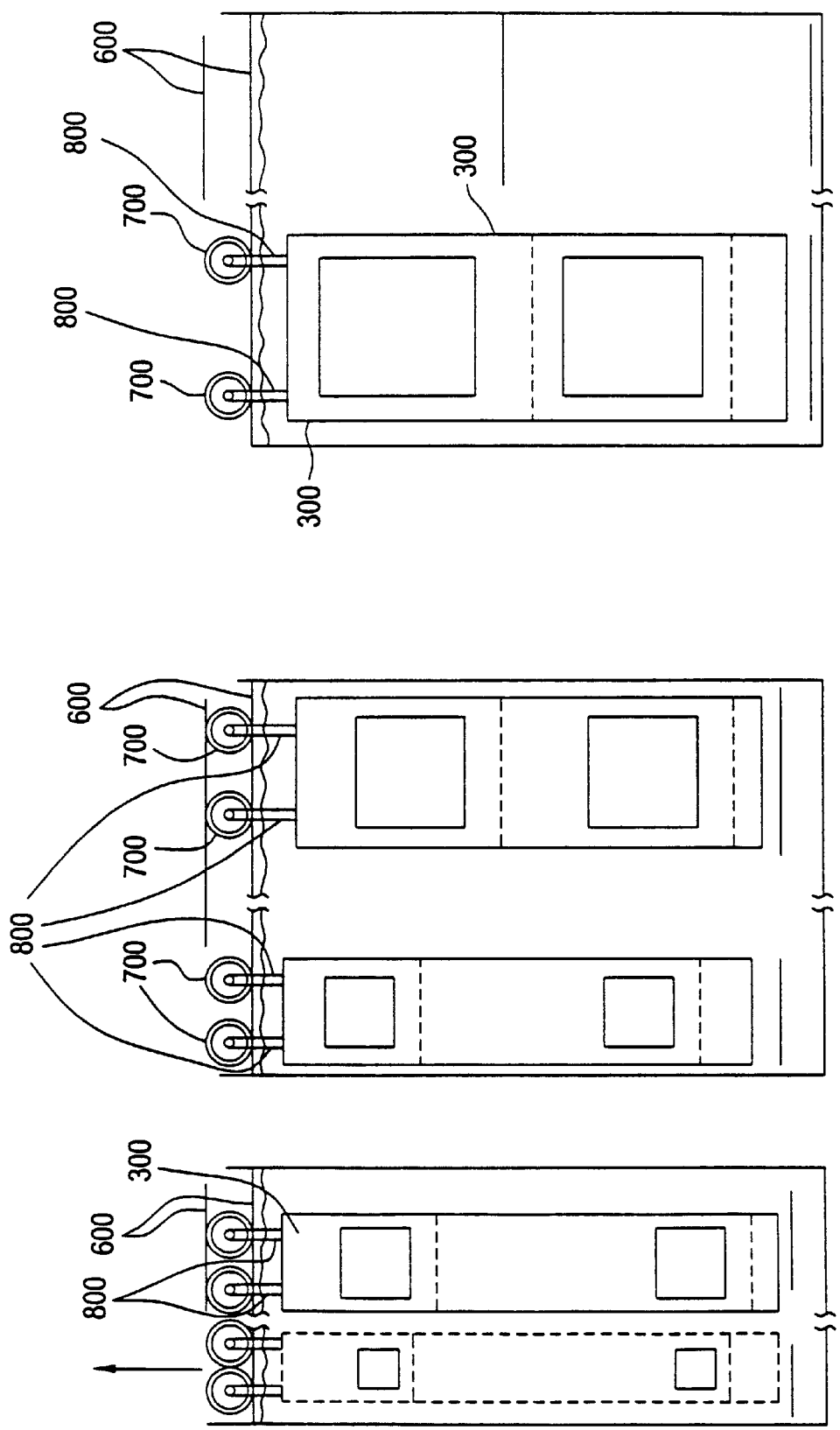
FIG. 5 is a side cross-sectional view of a multiple bath system.

Referring to FIG. 5, a plurality of liquid baths is shown. This system uses appropriate means for transporting one or more stacks of eggs between the various baths (and/or zones of the baths) are provided. Multiple bath systems are described in more detail in simultaneously filed Patent Application entitled "Apparatus And Methods For Pasteurizing In-Shell Eggs".

As an example, a carrier 300 preferably has, for example, mounts represented by the combination of wheels 700 and extensions 800, as shown in FIG. 5. The exemplary mounts permit a loader/unloader to load and unload the eggs in and out of the fluid as well as transport the eggs laterally from one zone or bath to another, as desired.

Two Fluid System

In the two fluid system, the temperature of the first fluid is preferably higher than the temperature of the second fluid. For example, the first fluid may be heated to approximately 137.5° F. and the temperature of the second fluid heated to, for example, approximately 133.5° F. This provides rapid increase of the internal egg temperature to a pasteurization level and then reduction of the temperature to avoid impairing the functionality of the outer portions of the eggs. Other temperatures are also contemplated for use with the two fluid system.

Figure 6:
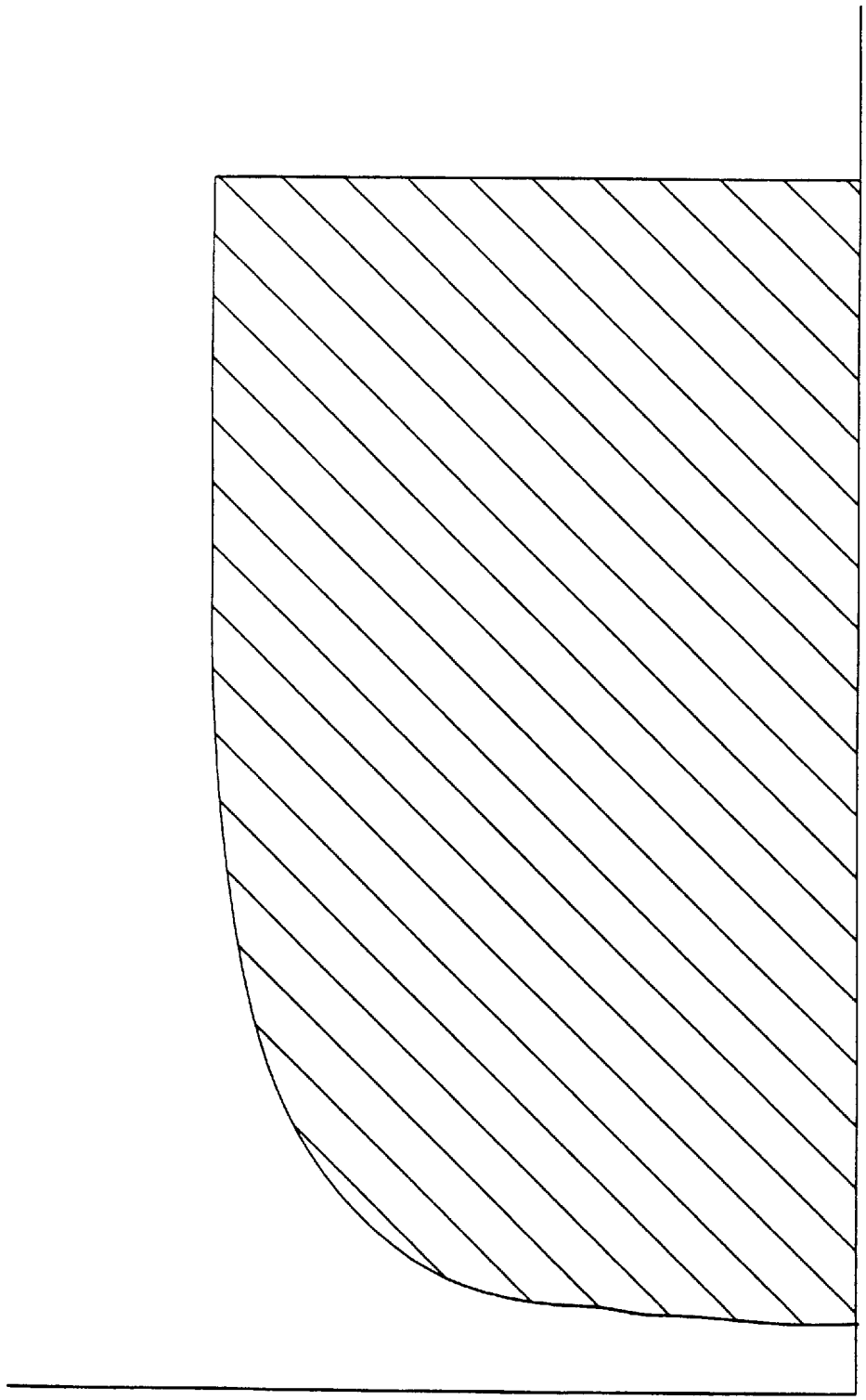
FIG. 6 shows a log kill rate versus time curve for a two bath system.

The present system may, for example, calculate the cumulative log kill by integrating an area under a log kill rate versus time curve for the two fluid system, as shown in FIG. 6. FIG. 6 shows the point at which the eggs are moved from one fluid to the next. In embodiments, the overall speed that the eggs move while enveloped by the fluid may be adjusted to ensure proper pasteurization.

As seen in FIG. 6, after an initial time, the log kill rate begins to slope upwards. Thereafter, the log kill rate levels off. As described above, however, the internal temperature of the eggs may fluctuate over time, thus, for example, resulting in fluctuations of the log kill rate, as seen in FIG. 6.

During this process the comparator periodically or continuously compares the area under the curve to a predetermined value. The cumulative log kill may be determined by integrating the area under the curve and comparing the area to one or more predetermined values.

The eggs processed in the two fluid system may achieve a desired reduction in Salmonella faster than in the one fluid system. This is because the eggs in the two fluid system are initially enveloped by a higher temperature fluid which provides rapid increase of the internal egg temperature to a pasteurization level, thus accelerating the log kill rate. This, in turn, may enable the eggs to reach a cumulative log kill faster than in the one fluid system.

Three Fluid System

In the three fluid system, for example, the first fluid and the third fluid may be at higher temperatures than the second fluid. For example, they may be heated to approximately 137.5° F., while the second fluid is heated, for example, to approximately 133.5° F. The higher third temperature permits more rapid pasteurization toward the end of the process. Again, other temperatures are also contemplated for use with the present invention.

Figure 7:
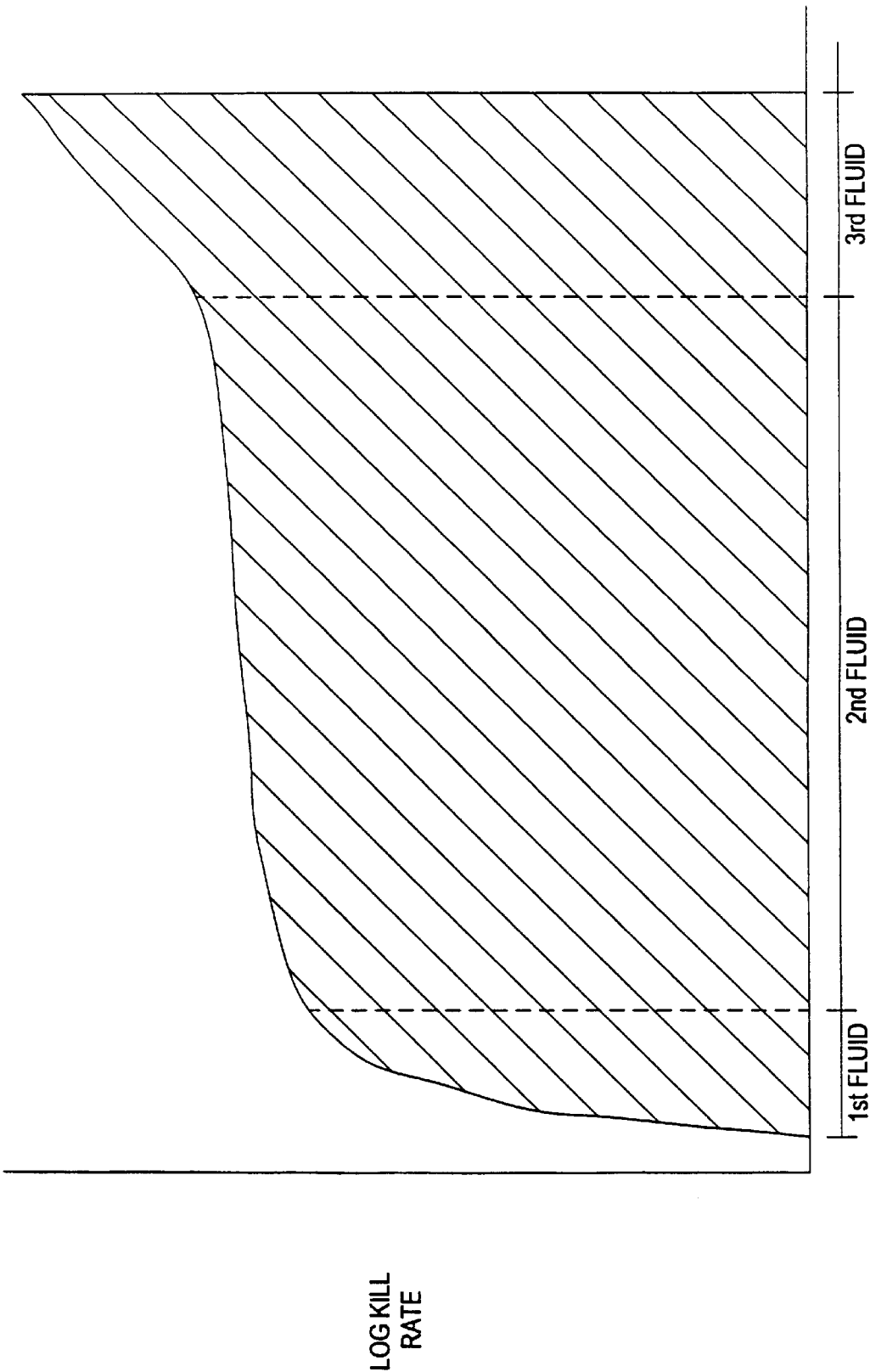
FIG. 7 shows a log kill rate versus time curve for a three bath system.

The present system may, for example, calculate the cumulative log kill by integrating an area under a log kill rate versus time curve for the three fluid system, as shown in FIG. 7. FIG. 7 shows the point at which the eggs are moved from one fluid to the next. As seen in FIG. 7, after an initial time, the log kill rate begins to slope upwards. Thereafter the log kill rate levels off. When the eggs enter the third fluid, the log kill rate again increases. As described above, however, the internal temperature of the egg may fluctuate over time, thus, for example, resulting in fluctuations of the log kill rate, as seen in FIG. 7.

The eggs in the three fluid system may achieve a desired reduction in Salmonella faster than in the one and two fluid systems. The higher first temperature provides rapid increase of the internal egg temperature to a pasteurization level and the higher third temperature permits more rapid pasteurization toward the end of the process, thus accelerating the log kill rate. This, in turn, may enable the eggs to reach a cumulative log kill faster than in the one and two fluid systems.

Preferred and alternative embodiments of the control systems and methods for controlling pasteurization of in-shell eggs have now been described in detail. However, this description of specific embodiments is merely illustrative of the principles underlying the inventive concepts. It is contemplated that various modifications of the disclosed embodiments will, without departing from the spirit and scope of the invention, be apparent to persons of ordinary skill in the art.

What is claimed is:

1. A method of controlling pasteurization of in-shell eggs by a heated fluid, comprising:
   (a) enveloping the eggs by the heated fluid;
   (b) at least periodically determining an internal temperature of the eggs while the eggs are enveloped by the heated fluid;
   (c) at least periodically determining at least one log kill rate of Salmonella in the eggs based on the internal temperature of the eggs;
   (d) at least periodically determining a cumulative log kill of Salmonella as a function of the at least one log kill rate and time;
   (e) at least periodically comparing the cumulative log kill to at least one predetermined value; and
   (f) generating a signal when the comparing reveals a predetermined relationship between the cumulative log kill and the predetermined value.

2. The method of claim 1, further comprising determining a time of beginning of pasteurization based on the internal temperature of the eggs.

3. The method of claim 2, wherein the cumulative log kill of Salmonella is first determined after the time of beginning of pasteurization.

4. The method of claim 1, wherein the internal temperature of the eggs is determined by calculation based on a time the eggs are enveloped by the heated fluid, the temperature of the heated fluid, an initial temperature of the eggs and size of the eggs.

5. The method of claim 4, wherein the initial temperature of the egg is determined by:
   (a) determining the size of the eggs;
   (b) monitoring an on-time of at least one heating element in the heated fluid until a temperature of the heated fluid after the eggs are enveloped by the heated fluid substantially equals a starting temperature of the heated fluid; and
   (c) determining the initial temperature of the eggs based on the starting temperature of the heated fluid, the on-time of the heating elements and the size of the eggs.

6. The method of claim 4, wherein the initial temperature of the eggs is determined by uniformly preheating the eggs to a predetermined initial temperature.

7. The method of claim 4, wherein the initial temperature of the eggs is determined by monitoring a temperature of the fluid after the eggs are enveloped by the fluid.

8. The method of claim 1, wherein the predetermined value is calculated based on a total log kill required for a desired degree of pasteurization.

9. The method of claim 1, wherein the predetermined value is a predetermined log kill value for a time at which the comparing takes place.

10. The method of claim 1, further comprising controlling the temperature of the heated fluid in response to the signal.

11. The method of claim 1, further comprising removing the eggs from the heated fluid and cooling the eggs in response to the signal.

12. The method of claim 11, wherein the signal is generated when the cumulative log kill of Salmonella is at least 3 logs.

13. The method of claim 1, further comprising adjusting a dwell time of the eggs in the heated fluid in response to the signal.

14. The method of claim 1, further comprising removing the eggs from the heated fluid and subsequently discarding, cooking or breaking the eggs and further processing the eggs in response to the signal.

15. The method of claim 13, wherein the time at which the comparing takes place is before a predetermined time at which sufficient pasteurization is expected to be completed.

16. The method of claim 1, wherein the heated fluid is in at least two different temperature zones, and the eggs are moved from one of the temperature zones to another of the temperature zones in response to the signal.

17. The method of claim 16, wherein the heated fluid is liquid and the different temperature zones comprise separate baths.

18. The method of claim 1, wherein the heated fluid is a liquid bath.

19. The method of claim 18, wherein the liquid bath is vertically perturbated.

20. An apparatus for controlling pasteurization of in-shell eggs by a heated fluid, comprising:
   (a) means for enveloping the eggs by the heated fluid;
   (b) means for at least periodically determining an internal temperature of the eggs while the eggs are enveloped by the heated fluid;
   (c) means for at least periodically determining at least one log kill rate of Salmonella in the eggs based on the internal temperature of the eggs;
   (d) means for at least periodically determining a cumulative log kill of Salmonella as a function of the at least one log kill rate and time;
   (e) means for at least periodically comparing the cumulative log kill to at least one predetermined value; and
   (f) means for generating a signal when the comparing reveals a predetermined relationship between the cumulative log kill and the predetermined value.

21. The apparatus of claim 20, further comprising:
   (a) means for monitoring an on-time of at least one heating element in the heated fluid until a temperature of the heated fluid after the eggs are enveloped by the heated fluid substantially equals a starting temperature of the heated fluid; and
   (b) means for determining the initial temperature of the eggs based on the starting temperature of the heated fluid, the on-time of the heating elements and the size of the eggs.

22. An apparatus for controlling pasteurization of in-shell eggs in contact with a heated fluid, comprising:
   (a) a first calculator that at least periodically determines an internal temperature of the eggs while the eggs are enveloped by the heated fluid;
   (b) a second calculator that at least periodically determines at least one log kill rate of Salmonella based on the internal temperature of the eggs;
   (c) a third calculator that at least periodically determines a cumulative log kill of Salmonella as a function of the at least one log kill rate and time;
   (d) a comparator that at least periodically compares the cumulative log kill to at least one predetermined value; and (e) a signal generator that generates a signal when the comparator reveals a predetermined relationship between the cumulative log kill and the predetermined value.

23. The apparatus of claim 22, further comprising a fourth calculator that determines a time of beginning of pasteurization based on the internal temperature of the eggs.

24. The apparatus of claim 22, wherein the first calculator determines the internal temperature of the eggs based on a time the eggs are enveloped by the heated fluid, the temperature of the heated fluid, an initial temperature of the eggs and size of the eggs.

25. The apparatus of claim 24, further comprising:

(a) an on-time monitor that monitors an on-time of at least one heating element in the heated fluid until a temperature of the heated fluid after the eggs are enveloped by the heated fluid substantially equals a starting temperature of the heated fluid; and (b) a fifth calculator that determines the initial temperature of the eggs based on the starting temperature of the heated fluid, the on-time of the heating elements and size of the eggs.

26. The apparatus of claim 24, further comprising a preheater that preheats the eggs to a predetermined initial temperature.

27. The apparatus of claim 22, further comprising a temperature controller for at least periodically controlling the temperature of the heated fluid in response to the signal.

28. The apparatus of claim 22, further comprising an unloading mechanism configured to remove the eggs from the heated fluid and move the eggs to a cooler in response to the signal.

29. The apparatus of claim 22, wherein the predetermined value is calculated based on a total log kill required for a desired degree of pasteurization.

30. The apparatus of claim 22, further comprising a dwell time adjuster to adjust a dwell time of the eggs in the heated fluid in response to the signal.

31. The apparatus of claim 22, wherein the heated fluid is in at least two different temperature zones, and the eggs are moved from one of the temperature zones to another of the temperature zones in response to the signal.

32. The apparatus of claim 31, wherein the heated fluid is a liquid and the different temperature zones comprise separate baths.

33. The apparatus of claim 22, wherein the heated fluid is a liquid in a bath containing a perturbator for vertically perturbating the liquid.

34. The apparatus of claim 22, wherein the first, second and third calculators comprise a processor programmed to (i) at least periodically determine an internal temperature of the eggs, (ii) at least periodically determine at least one log kill rate and (iii) at least periodically determine a cumulative log kill.

35. A method of controlling pasteurization of in-shell eggs, comprising:

(a) preheating the in-shell eggs to a predetermined initial temperature;

(b) further heating the eggs by contact with a heated fluid while maintaining a temperature of the heated fluid at a substantially constant temperature while the eggs are in contact with the heated fluid;

(c) maintaining the in-shell eggs in contact with the heated fluid for a predetermined time, wherein the predetermined time is a function of a cumulative log kill rate of Salmonella at the temperature of the heated fluid and a desired log kill level; and (d) removing the eggs from contact with the heated fluid at an end of the predetermined time.

36. The method of claim 35, further comprising chilling the eggs upon removing the eggs from the heated fluid.

\* \* \* \* \*